United States Patent
Mahoney et al.

(10) Patent No.: US 11,680,176 B1
(45) Date of Patent: Jun. 20, 2023

(54) SELECTIVE RESHAPING OF NANOPARTICLES IN THREE DIMENSIONAL ARTICLES

(71) Applicant: Government of the United States, as represented by the Secretary of the Air Force, Wright-Patterson AFB, OH (US)

(72) Inventors: Clare M. Mahoney, Washington, DC (US); Richard A. Vaia, Beavercreek, OH (US); Kyoungweon Park, Beavercreek, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 17/522,994

(22) Filed: Nov. 10, 2021

Related U.S. Application Data

(63) Continuation of application No. 16/415,163, filed on May 17, 2019, now Pat. No. 11,203,696.

(60) Provisional application No. 62/793,082, filed on Jan. 16, 2019.

(51) Int. Cl.
| | | |
|---|---|---|
| *C09D 11/037* | (2014.01) | |
| *C09D 11/107* | (2014.01) | |
| *B33Y 70/00* | (2020.01) | |
| *B29C 35/08* | (2006.01) | |
| *C09D 11/101* | (2014.01) | |
| *C09D 11/106* | (2014.01) | |
| *B33Y 80/00* | (2015.01) | |
| *B29K 105/16* | (2006.01) | |

(52) U.S. Cl.
CPC ........ *C09D 11/037* (2013.01); *B29C 35/0805* (2013.01); *B33Y 70/00* (2014.12); *B33Y 80/00* (2014.12); *C09D 11/101* (2013.01); *C09D 11/106* (2013.01); *C09D 11/107* (2013.01); *B29K 2105/162* (2013.01)

(58) Field of Classification Search
CPC ... C09D 11/037; C09D 11/101; C09D 11/106; C09D 11/107; B29C 35/0805; B33Y 70/00; B33Y 80/00; B29K 2105/162
See application file for complete search history.

(56) References Cited

U.S. PATENT DOCUMENTS

| | | | |
|---|---|---|---|
| 10,010,508 B1 | 7/2018 | Polito et al. | |
| 2017/0298232 A1* | 10/2017 | Farrugia | B33Y 70/10 |

OTHER PUBLICATIONS

Qiao et al., machine English translation of CN 106735173 (Year: 2017).*
Ma Zhiya, Xia Hongxing, Liu Yuping, Liu Bo, Chen Wei & Zhao Yuandi Applications of gold nanorods in biomedical imaging and related fields Chinese Science Bulletin 2013 vol. 58 No. 21: 2530-2536.
Liu, Yu; Mills, Eric N.; Composto, Russell J.; Tuning optical properties of gold nanorods in polymer films through thermal reshaping Journal of Materials Chemistry 2009, 19, 2704-2709.
Perez-Juste, Jorge; Rodriguez-Gonzalez, Benito; Mulvaney, Paul; Liz-Marzan, Luis M.; Optical Control and Patterning of Gold-Nanorod-Poly(vinyl-alcohol) Nanocomposite Films Advanced Functional Materials 2005, 15, 1065-1071.
Zijlstra, Peter; Chon, James W. M.; Gu, Min; Five-dimensional optical recording mediated by surface plasmons in gold nanorods Nature 2009, vol. 459, 401-413.
Zoua, Renxian; Zhanga, Qiao; Zhaob, Qing; Penga, Feng; Wanga, Hongjuan; Yua, Hao; Yanga, Jian; Thermal stability of gold nanorods in an aqueous solution Colloids and Surfaces A: Physicochem. Eng. Aspects 2010, 372, 177-181.
Mahoney, Clare; Park, Kyoungweon; Jawaid, Ali; Kowalski, Benjamin; Gillman, Andrew Fondiglia, Vincent; Treml, Benjamin; White, Timothy; Vaia, Richard A.; Low-energy, nanoparticle reshaping for large-area, patterned, plasmonic nanocomposites J. Mater. Chem. C, 2018, 6, 7157.
Park, Kyoungweon; Hsiao, Ming-Siao; Yi, Yoon-Jae; Izor, Sarah; Koerner, Hilmar; Jawaid, Ali Vaia, Richard A.; Highly Concentrated Seed-Mediated Synthesis of Monodispersed Gold Nanorods. ACS Appl. Mater. Interfaces 2017, 9, 26363-26371.
Park, Kyoungweon; Biswas, Sushmita; Kanel, Sushil; Nepal, Dhriti; Vaia, Richard A.; Engineering the Optical Properties of Gold Nanorods: Independent Tuning of Surface Plasmon Energy, Extinction Coefficient, and Scattering Cross Section. J. Phys. Chem. C 2014, 118, 5918-5926.

* cited by examiner

*Primary Examiner* — Jessica M Roswell
(74) *Attorney, Agent, or Firm* — AFMCLO/JAZ; James F. McBride

(57) ABSTRACT

The present invention relates to processes for selective reshaping of nanoparticles in three dimensional articles, three dimensional articles produced by such processes, and methods of using such three dimensional articles. As a result of the aforementioned process, such three dimensional articles can have selective tuning that arises, at least in part, from the reshaped nanoparticles found in such articles. Such tuning provides the aforementioned articles with superior performance that can be advantageous in the areas including such as optical filters, multi-functional composites and sensing elements.

17 Claims, 6 Drawing Sheets
(6 of 6 Drawing Sheet(s) Filed in Color)

US 11,680,176 B1

SELECTIVE RESHAPING OF NANOPARTICLES IN THREE DIMENSIONAL ARTICLES

RIGHTS OF THE GOVERNMENT

The invention described herein may be manufactured and used by or for the Government of the United States for all governmental purposes without the payment of any royalty.

FIELD OF THE INVENTION

The present invention relates to processes for selective reshaping of nanoparticles in three dimensional articles, three dimensional articles produced by such processes, and methods of using such three dimensional articles.

BACKGROUND OF THE INVENTION

Three dimensional articles comprising nanoparticles such as optical filters, multi-functional composites and sensing elements are produced by processes that typically require multiple feed stock additive manufacturing or two dimensional patterning of nanoparticles and then stacking of such dimensional patterns to form a three dimensional article—this process is known by the skilled artisan as spatially multiplexing different plasmonic effects via by site specific assembly. Unfortunately, such processes can only produce a limited number of specific three dimensional articles as multiple feed stock additive manufacturing is limited to a small number of feedstocks and the stacking required in the three dimensional process is limited in the number of structures that can be made due to the inherent limitations, such as process controls, associated with the stacking process.

Applicants recognized that the source of the aforementioned problems was the fact that current processes reshaped the nanoparticles in the feedstock material rather than in the three dimensional article itself. By reshaping the nanoparticles in the three dimensional article itself, each nanoparticle can be selectively shaped as desired to yield a highly selectively tuned three dimensional article. Such tuning can include, but is not limited to, selective electromagnetic radiation absorption. Thus, Applicants disclose a process of reshaping the nanoparticles in the three dimensional article and selectively tuned three dimensional articles.

SUMMARY OF THE INVENTION

The present invention relates to processes for selective reshaping of nanoparticles in three dimensional articles, three dimensional articles produced by such processes, and methods of using such three dimensional articles. As a result of the aforementioned process, such three dimensional articles can have selective tuning that arises, at least in part, from the reshaped nanoparticles found in such articles. Such tuning provides the aforementioned articles with superior performance that can be advantageous in the areas including such as optical filters, multi-functional composites and sensing elements.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1:
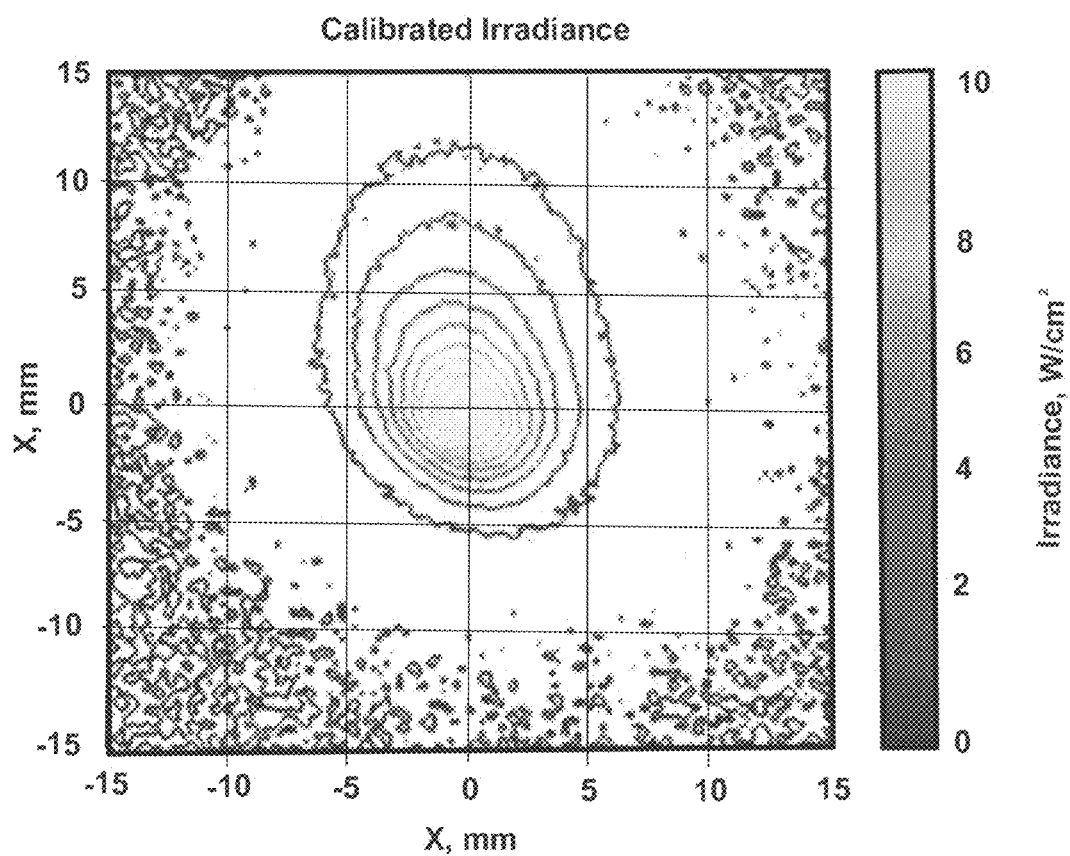
FIG. 1 Optical patterning of AuNR-PVA plasmonic nanocomposite. Beam profile of a Xenon Arc lamp showing spatial distribution of the irradiation power density FIG. 2 Optical patterning of AuNR-PVA plasmonic nanocomposite. Corresponding temperature profile induced from irradiating a AuNR-PVA film (AR ~2.8, ca. 50 nM, 25 mM CTAB, 100 µm.)
Figure 2:
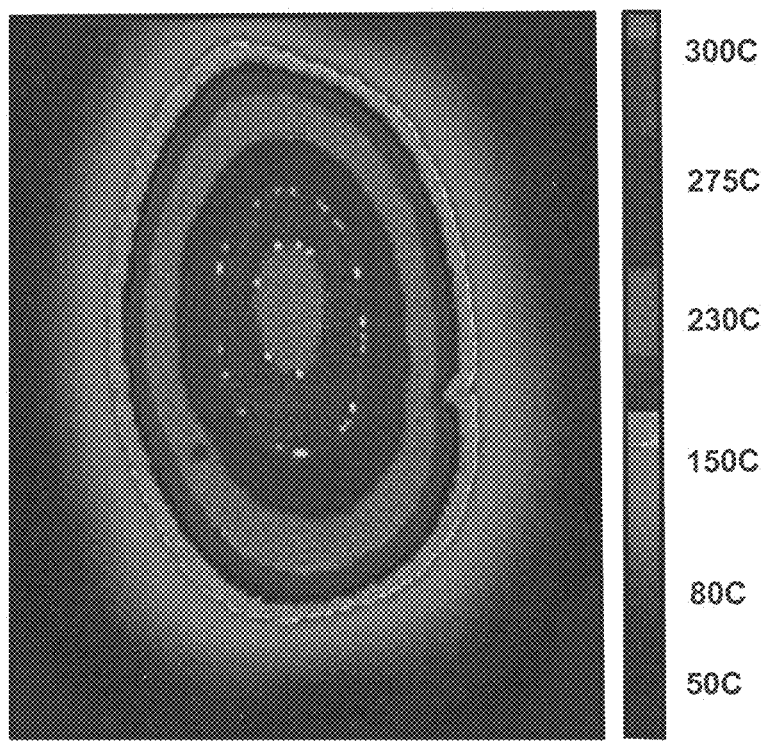
Figure 3:
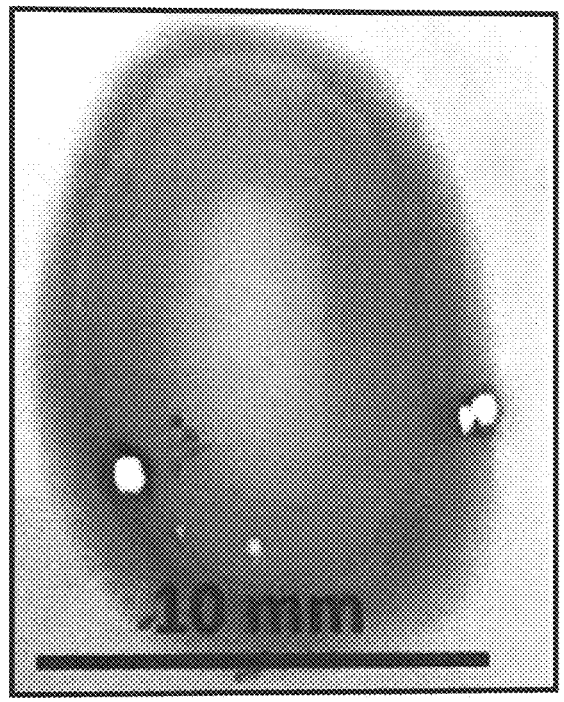
FIG. 3 Optical patterning of AuNR-PVA plasmonic nanocomposite. Resulting film showing the color gradient.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Definitions

Unless specifically stated otherwise, as used herein, the terms "a", "an" and "the" mean "at least one".

As used herein, the terms "include", "includes" and "including" are meant to be non-limiting.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

As previously stated, spatially multiplexing different plasmonic effects within a three dimensional structure is challenging, requiring fabrication of each component followed by site specific assembly. Post-fabrication methods that locally reshape a stock plasmonic unit afford substantial efficiency in constructing such pixelated and voxelated materials. However, available approaches require large energy density, pulsed lasers, lengthy time, or excessive control of reactants to be viable for solid-state patterning at high manufacturing rates or in low temperature matrices, such as polymers, paper and biomaterials.

To address the challenge of post-fabrication reshaping, Applicants disclose a process that combines features of photo-thermal processes with photo-chemistry at the nanoparticle surface using constraints imposed by the matrix to provide isovolumetric control. Broadband non-coherent light sources, rather than pulsed lasers, are used to provide photo-thermal heating to drive localized redox processes. Surprisingly, the nanoparticle volume and its single crystallinity are retained, and complete reshaping with light occurs 100×faster than comparable thermal anneals (10 sec-100 sec v. hours to days). Finally, the process's dependency on optical power and reactant concentration provide approaches to spatially control the rate while preserving particle alignment, enabling multi-exposure and multi-color patterning. Applicants' low energy, optically driven processes all cost-effective, rapid manufacture of materials with pixilated, voxelated or gradient plasmonic properties such as opto-electronics, colorimetric sensors, polarization sensitive filters, and imaging taggants.

Three Dimensional Articles

For purposes of this specification, headings are not considered paragraphs and thus this paragraph is Paragraph 0023 of the present specification. The individual number of each paragraph above and below this paragraph can be determined by reference to this paragraph's number. In this paragraph 0023, Applicants disclose a three dimensional article comprising:
  a) a matrix material; preferably said matrix comprises a polymer that serves as a reductant;
  b) a population of nanoparticles;
  c) an optional oxidant; and
  d) an optional reductant
said population of nanoparticles being dispersed in said matrix material to provide a morphology gradient greater than 0.03 nm/μm, preferably greater than 0.03 nm/μm to about 3 nm/μm more preferably greater than 1 nm/μm to about 3 nm/μm, most preferably greater than 2 nm/μm to about 3 nm/μm.

Applicants disclose a three dimensional article according to Paragraph 0023, wherein said population of nanoparticles are plasmonic, preferably said population of nanoparticles comprises nanoparticles that comprise a material selected from the group consisting of gold, silver, copper, platinum, palladium, aluminum and mixtures thereof, more preferably said population of nanoparticles comprises nanoparticles that comprise a material selected from the group consisting of gold, silver and mixtures thereof.

Applicants disclose a three dimensional article according to Paragraphs 0023 through 0024, said three dimensional article comprising, based on total three dimensional article weight, from about 0.001% to about 0.2%, more preferably, from about 0.01% to about 0.2%, most preferably from about 0.1% to about 0.2% of said nanoparticles.

Applicants disclose a three dimensional article according to Paragraphs 0023 through 0025, wherein said population of nanoparticles has an average nanoparticle volume of from about 1000 nanometer cubed to about 50,000 nanometer cubed, more preferably, from about 5000 nanometer cubed to about 50,000 nanometer cubed, most preferably from about 8000 nanometer cubed to about 50,000 nanometer cubed of said nanoparticles.

Applicants disclose a three dimensional article according to Paragraphs 0023 through 0026, wherein said matrix material is selected from the group consisting of a polymer, thermoplastics, thermosets, elastomers and mixtures thereof, preferably, said matrix material comprises a polymer, preferably said polymer is selected from the group consisting of Poly(vinyl alcohol) (PVA), poly(ethylene oxide) (PEO), poly(methyl methacrylate) (PMMA), poly(styrene) (PS) and mixtures thereof, more preferably said polymer is selected from the group consisting of Poly(vinyl alcohol) (PVA), poly(ethylene oxide) (PEO) and mixtures thereof, most preferably said polymer comprises Poly(vinyl alcohol) (PVA).

Applicants disclose a three dimensional article according to Paragraphs 0023 through 0026, comprising an oxidant, said oxidant comprising a cationic surfactants; preferably said oxidant is selected from the group consisting of halogenated surfactants and mixtures thereof, more preferably said oxidant comprises an ammonium brominated surfactant, most preferably said oxidant comprises Hexadecyltrimethylammonium bromide (CTAB), preferably said matrix comprises based on total three dimensional article weight, from about 0.0001% to about 50%, more preferably, from about 0.01% to about 10%, most preferably from about 1% to about 5% of said oxidant.

Applicants disclose a three dimensional article according to Paragraphs 0023 through 0026, comprising a reductant, said reductant being selected from the group consisting of reducing agents, sugars, alcohols, carboxylic acids, aldehydes and mixtures thereof, preferably said reductant is selected from the group consisting of alcohols and carboxylic acids and mixtures thereof, more preferably said reductant comprises an alcohol, most preferably said reductant comprises poly (vinyl alcohol), preferably said matrix comprises based on total three dimensional article weight, from about 10% to about 99.9999%, more preferably, from about 25% to about 99.99%, most preferably from about 95% to about 99.95% of said reductant. If the extra reducing agent needs to be introduced, the reducing agent comprises based on total three dimensional article weight, from about 0.0001% to about 50%, more preferably, from about 0.01% to about 10%, most preferably from about 1% to about 5% of said reductant.

Process

Applicants disclose a process of reshaping a population of nanoparticles, said process comprising a) contacting said population of nanoparticles in a carrier, said carrier having a viscosity of at least 3 cps, preferably said carrier's viscosity is from about 3 cps to infinity, more preferably from about 10,000 to infinity, most preferably from about 30,000 to infinity, with an oxidant and a reductant, preferably said contacting step comprising contacting said population of nanoparticles with said oxidant, then contacting said population of nanoparticles with said reductant b) exposing said contacted population of nanoparticles to an energy source for a sufficient period of time to provide said population of nanoparticles with at least 0.01 Wcm$^{-2}$ or at least 1 Wcm$^{-2}$, preferably said contacted population of nanoparticles are exposed to sufficient light to provide said population of nanoparticles with from about 0.1 Wcm$^{-2}$ to about 13 Wcm$^{-2}$, more preferably said contacted population of nanoparticles are exposed to sufficient light to provide said population of nanoparticles with from about 1 Wcm$^{-2}$ to about 13 Wcm-2, most preferably said contacted population of nanoparticles are exposed to sufficient light to provide said population of nanoparticles with from about 10 Wcm$^{-2}$ to about 13 Wcm$^{-2}$.

Applicants disclose a process according to Paragraph 0030 wherein said exposing said contacted population of nanoparticles to an energy source comprises exposing said contacted population of nanoparticles to:

a) light having a wavelength from about 190 nanometers to about 2500 nanometers, preferably said light having a wavelength of from about 200 nanometers to about 2000 nanometers, more preferably said light having a wavelength of from about 350 nanometers to about 1500 nanometers, most preferably said light having a wavelength of from about 400 nanometers to about 1200 nanometers, for at least one second, preferably from about 1 second to about 60 min, more preferably from about 5 sec to about 30 min, most preferably from about 10 sec to about 5 min; or b) a heat source, preferably said heat source is selected from an oven, hot plate and combinations thereof; preferably exposing said contacted population of nanoparticles to an energy source comprises exposing said contacted population of nanoparticles to said light. Light is the preferred energy source as light allows for a more controlled and faster reshaping process.

Applicants disclose a process according to Paragraphs 0030 through 0031, wherein said carrier is a three dimensional article comprising said reductant and said population of nanoparticles are coated with said oxidant, said population of nanoparticles being dispersed within said three dimensional article.

Test Methods

Morphology Gradient Test

The morphology gradient of population of nanoparticles is measured via plasmonic shift as provided in the test method titled ASTM E275-08 using a CRAIC microspectrometer. A single sample is used to determine the morphology gradient of population of nanoparticles. The sample size is as required by the CRAIC microspectrometer instructions. Using the CRAIC microspectrometer the longitudinal peak position and shortest peak position as well as the distance between the two peaks is determined—peak positions are determined from extinction spectrum. For purposes of the present specification, the morphology gradient is the difference between longitudinal peak position and shortest peak position divided by the distance between the two populations. The resulting morphology gradient is expressed in units of nm/μm.

Weight Percent of Nanoparticles Test

Nanoparticle weight percent is determined by the mass of total nanoparticles divided by total material mass. The mass of the total nanoparticles is estimated using a UV-Vis-NIR spectrometer as specified below and the Beer-Lamberts equation.

$$A_{L-LSPR} = \varepsilon \cdot C_{AuNR} \cdot L$$

Where A is the optical density of the nanoparticle solution, a is extinction coefficient of the nanoparticles, L is the path length. From this equation, the concentration of nanoparticles is estimated and converted to the mass.

UV-Vis-NIR Spectrometer Specification

Measure 175 to 3300 nm using a PbSmart NIR detector for extended photometric range WinUV software—modular software with power analysis and enhanced transfer and report export capabilities Variable slit widths (down to 0.01 nm) for optimum control over data resolution Maximum light throughput using Schwarzchild coupling optics for higher accuracy at low transmission levels Minimal noise and stray light using a floating aluminum casting and double Littrow monochromator Extended dynamic range by attenuating the reference beam more in line with the sample absorbance.

Average Nanoparticle Volume Test

Average nanoparticle volume is determined by TEM image analysis which measures the dimension (length and width) of nanoparticles. 500 particles are measured from the respective sample and the average volume of the 500 particles is considered the Average Nanoparticle Volume.

Viscosity Test

For purposes of the present application viscosity is determined by using the following method: (ref: ISSN 1392-2114 ULTRAGARSAS (ULTRASOUND), Vol. 66, No. 4, 2011)

EXAMPLES

The following example illustrates particular properties and advantages of some of the embodiments of the present invention. Furthermore, these are examples of reduction to practice of the present invention and confirmation that the principles described in the present invention are therefore valid but should not be construed as in any way limiting the scope of the invention.

Example 1: Process of Making and Reshaping a Population of Nanoparticles and Making Three Dimensional Article Using Polyvinyl Alcohol Materials: Hexadecyltrimethylammonium bromide (CTAB) was purchased from GFS chemicals. Hexadecyltrimethylammonium chloride (CTAC) was purchased from Aldrich. Benzyldimethylhexadecylammonium chloride (BDAC) was purchased from TCI America. HAuCl4, AgNO3, sodium borohydride and L-ascorbic acid were purchased from Aldrich. Polyvinylalcohol (PVA, MW=89,000-98,000, 99+% hydrolyzed, Tg=80° C., 341584) and polyethylene oxide (PEO, MW=35,000, Tg=65° C.) were purchased from Sigma-Aldrich. Thiol terminated polystyrene (PS-SH, MW=10,000) and bulk polystyrene (MW=35,000) were purchased from Polymer Source and Sigma-Aldrich, respectively.

Synthesis of AuNRs and fabrication of AuNR/polymer composites: The AuNRs were synthesized according to seed growth method modified for scale up production as in accordance with the method provided in Park, K.; Hsiao, M.-s.; Yi, Y.-J.; Izor, S.; Koerner, H.; Jawaid, A.; Vaia, R. A. Highly Concentrated Seed-Mediated Synthesis of Monodispersed Gold Nanorods. ACS Applied Materials & Interfaces 2017. AuNR dimensions were determined through both UV-Vis spectroscopy as well as TEM image analysis. As-made AuNRs were purified from the growth solution via a series of centrifugation steps to remove unreacted reactants. The initial growth solution was first centrifuged at 8500 RCF (relative centrifugal force) in a 50 mL tube for 30 minutes. The sedimented nanorods were then transferred to a 2 mL centrifuge tube and subsequently spun at 9600 RCF for 30 minutes. After centrifugation, the supernatant was removed and replaced with a 25 mM CTAB/DI-$H_2O$ solution. This washing step was repeated two times. The solution of AuNRs was then stored (aged) at room temperature and standard pressure for 3-6 additional days. For the PS grafted AuNRs, a ligand exchange was done through solvent transfer processes of CTAB coated AuNRs in DI-$H_2O$ to PS-SH (10 mM) in toluene. Average nanoparticle volume of the is determined in accordance with the test method of the present specification and is found to be 5340 nm3

To fabricate films, the AuNR stock solution was added to 2 mL solution of 10 wt % PVA in $H_2O$ (or 10 wt % PS in toluene for the PS-grafted AuNRs.) To vary the amount of CTAB in AuNR films, either additional CTAB was added to the solution before drop casting, or an additional wash step was implemented to remove excess CTAB. The amount of CTAB was confirmed through UV-Vis. The AuNRs-PVA/$H_2O$ (or PS/toluene) solution was homogenously mixed through bath sonication, after which was left to settle, in the case of any potential bubbles that formed in the solution from sonication. After settling, the solution was drop cast on 2 in×2 in glass slides and spread evenly across the glass for controlled solution casting. After drop casting, the films were left to dry overnight. The concentration of AuNRs was determined using Beer-Lambert's Law where film thickness was measured with a micrometer, optical density was determined at the longitudinal surface plasmon resonance (L-LSPR) peak using UV-Vis-NIR spectroscopy and extinction coefficient for NRs of a given dimension was used from Park, K.; Biswas, S.; Kanel, S.; Nepal, D.; Vaia, R. A. Engineering the Optical Properties of Gold Nanorods: Independent Tuning of Surface Plasmon Energy, Extinction Coefficient, and Scattering Cross Section. The Journal of Physical Chemistry C 2014, 118, 5918-5926. Films of aligned AuNRs were prepared by post-process through incremental stretching of the PVA composite at 90° C. (10° C. above Tg).

Thermal and photo-thermal processing of AuNRs/polymer nanocomposites: For thermal processing, films were placed in a conventional oven or on a calibrated gradient hot plate. For photo-thermal processing, a CRAIC Xe Arc Lamp was used as a light source (approximated power density 10 W/$cm^2$, spot size ca. 1 mm diameter). Unless otherwise noted, the solid AuNR/PVA films were mounted on a conventional glass slide. The reported optical power densities were experimentally determined using a Thor Labs thermal power meter (model S302C.) The bulk temperature of the photo-thermal processed films was estimated by a calibrated IR camera (Model FLIR SC620)

Figure 4:
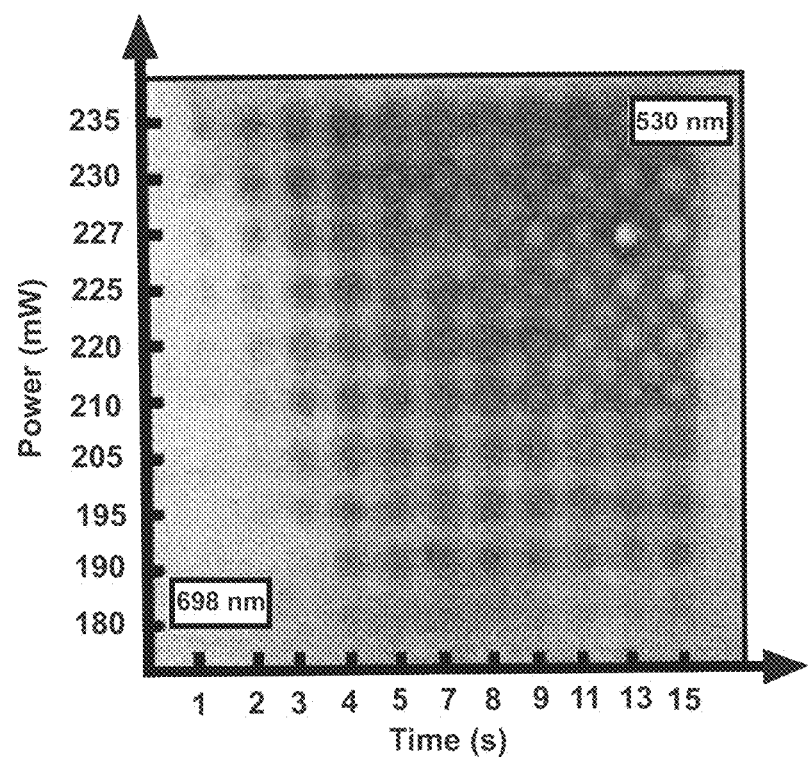
FIG. 4 Optical patterning of AuNR-PVA plasmonic nanocomposite. Color map for various combination of exposure time and irradiation power for AuNR-PVA film (AR ~2.8, ca. 50 nM, 25 mM CTAB, 100 µm) without a glass substrate. Each spot ca. 1 mm.
Figure 5:
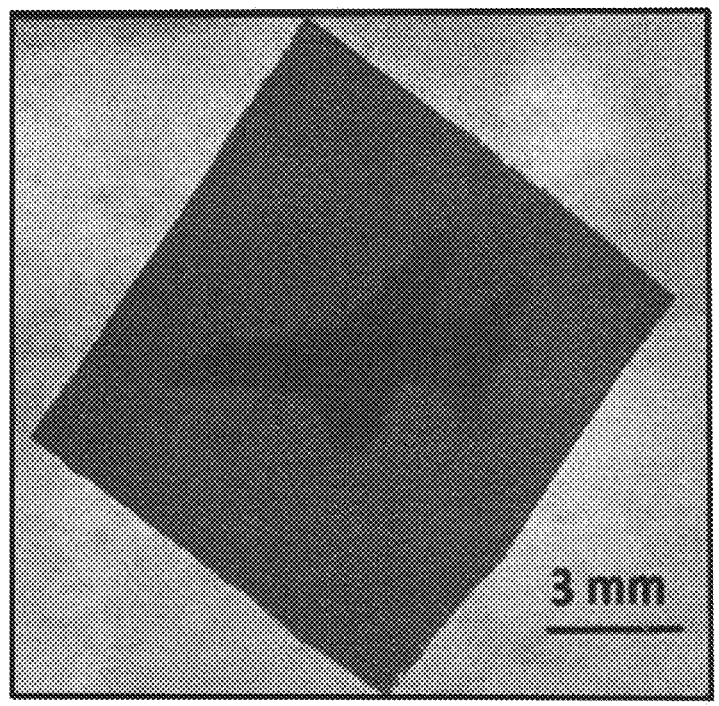
FIG. 5 Optical patterning of AuNR-PVA plasmonic nanocomposite. Example binary pattern formation (ca. 40 mW/cm$^2$, spot size 100 µm, irradiation time 100 ms.)
Figure 6:
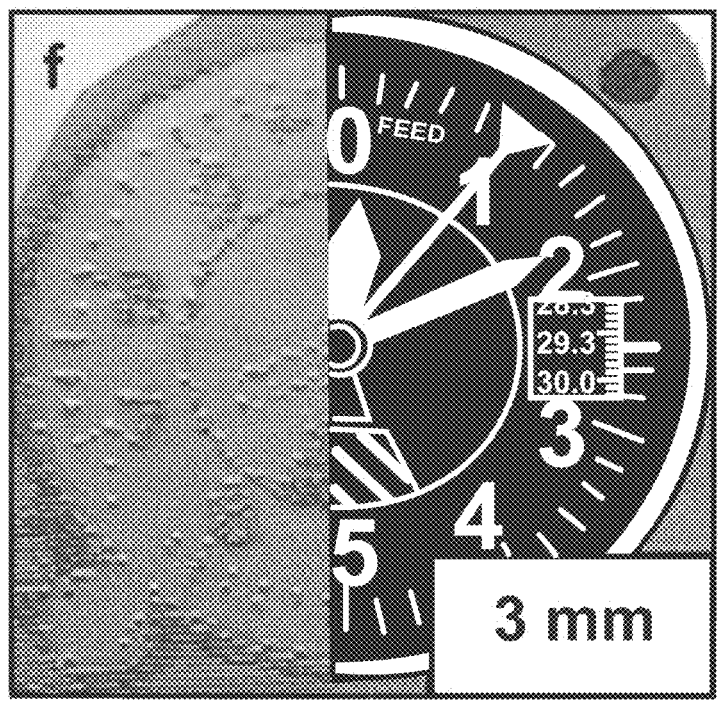
FIG. 6 Optical patterning of AuNR-PVA plasmonic nanocomposite. Example of a multi-exposure image of reshaped AuNRs where irradiation time alternates between 100 ms and 500 ms.

Optical patterning: The color map (FIG. 4) for various combination of exposure time and irradiation power was produced using broadband light from the CRAIC at varying exposure times and power densities. The film was not mounted on glass. The printed thunderbird film (FIG. 5) was acquired using a diode pumped solid state laser at 442 nm wavelength with a spot size of 100 μm, power density of 40 mW/$cm^2$ and irradiation time of 500 ms. For the altimeter film (FIG. 6), similar specifications were used, however two exposure times (750 ms and 1500 ms) were chosen to reshape the rods to AR=2 and AR=1, respectively.

Morphology gradient is determined in accordance with the test method of the present specification and is found to be a longitudinal plasmon resonance of 0.01 eV $mm^{-1}$ (3 nm $mm^{-1}$). Weight percent of nanoparticles is determined in accordance with the test method of the present specification and is found to be 0.3%

Example 2: Process of Making and Reshaping a Population of Nanoparticles and Making Three Dimensional Article Using Poly (Carboxylate-Co-Vinyl Alcohol)

Example 1 was repeated except the PVA is replaced with Poly (carboxylate-co-vinyl alcohol) having approximately the same MW and Tg as the PVA used in Example 1. Approximately the same results as obtained in Example 1 are obtained.

Example 3: Process of Making and Reshaping a Population of Nanoparticles and Making Three Dimensional Article Using Acrylic Acid-Vinyl Alcohol Graft Copolymers Example 1 was repeated except the PVA is replaced with Acrylic acid-vinyl alcohol graft copolymers having approximately the same MW and Tg as the PVA used in Example 1. Approximately the same results as obtained in Example 1 are obtained.

Example 4: Process of Making and Reshaping a Population of Nanoparticles and Making Three Dimensional Article Using Ethylene-Vinyl Alcohol Copolymers Example 1 was repeated except the PVA is replaced with Ethylene-vinyl alcohol copolymers having approximately the same MW and Tg as the PVA used in Example 1. Approximately the same results as obtained in Example 1 are obtained.

Example 5: Process of Making and Reshaping a Population of Nanoparticles and Making Three Dimensional Article Using Glycosylated Poly(Vinyl Alcohol)

Example 1 was repeated except the PVA is replaced with Glycosylated poly(vinyl alcohol) having approximately the same MW and Tg as the PVA used in Example 1. Approximately the same results as obtained in Example 1 are obtained.

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A three dimensional article comprising:
   a) a matrix material;
   b) a population of nanoparticles;
   c) an optional oxidant; and
   d) an optional reductant
   said population of nanoparticles being dispersed in said matrix material to provide a morphology gradient greater than 0.03 nm/μm.

2. The three dimensional article according to claim 1, wherein, said population of nanoparticles is dispersed in said matrix material to provide a morphology gradient greater than 0.03 nm/μm to about 3 nm/μm.

3. The three dimensional article according to claim 2, wherein, said population of nanoparticles is dispersed in said matrix material to provide a morphology gradient greater than 2 nm/μm to about 3 nm/μm.

4. The three dimensional article according to claim 1, wherein said population of nanoparticles are plasmonic.

5. The three dimensional article according to claim 4, wherein said population of nanoparticles comprises nanoparticles that comprise a material selected from the group consisting of gold, silver, copper, platinum, palladium, aluminum and mixtures thereof.

6. The three dimensional article according to claim 5, wherein said population of nanoparticles comprises nanoparticles that comprise a material selected from the group consisting of gold, silver and mixtures thereof.

7. The three dimensional article according to claim 1 said three dimensional article comprising, based on total three dimensional article weight, from about 0.001% to about 0.2% of said nanoparticles.

8. The three dimensional article according to claim 7 said three dimensional article comprising, based on total three dimensional article weight, from about 0.1% to about 0.2% of said nanoparticles.

9. The three dimensional article according to claim 1, wherein said population of nanoparticles has an average nanoparticle volume of from about 1000 nanometer cubed to about 50,000 nanometer cubed of said nanoparticles.

10. The three dimensional article according to claim 9, wherein said population of nanoparticles has an average nanoparticle volume of from about 8000 nanometer cubed to about 50,000 nanometer cubed of said nanoparticles.

11. The three dimensional article according to claim 1, wherein said matrix material is selected from the group consisting of a polymer, thermoplastics, thermosets, elastomers and mixtures thereof.

12. The three dimensional article according to claim 11, wherein said matrix material is selected from the group consisting of Poly(vinyl alcohol), poly(ethylene oxide), poly (methyl methacrylate), poly(styrene) and mixtures thereof.

13. The three dimensional article according to claim 12, wherein said matrix material comprises Poly(vinyl alcohol).

14. The three dimensional article according to claim 2, comprising, based on total three dimensional article weight, from about 0.0001% to about 50% of an oxidant, said oxidant comprising a cationic surfactant.

15. The three dimensional article according to claim 14 comprising, based on total three dimensional article weight, from about 0.01% to about 10% of an oxidant, said oxidant being an ammonium brominated surfactants.

16. The three dimensional article according to claim 14 comprising, based on total three dimensional article weight, from about 1% to about 5% of an oxidant, said oxidant comprising Hexadecyltrimethylammonium bromide.

17. The three dimensional article according to claim 2 comprising a reductant, selected from the group consisting of reducing agents, sugars, alcohols, carboxylic acids, aldehydes and mixtures thereof.

* * * * *